(12) United States Patent
Kim

(10) Patent No.: US 10,718,516 B2
(45) Date of Patent: Jul. 21, 2020

(54) VARIABLE ORIFICE FOR PULVERIZED COAL PIPE OF PULVERIZER

(71) Applicant: Do Gyun Kim, Gyeongsangnam-do (KR)

(72) Inventor: Do Gyun Kim, Gyeongsangnam-do (KR)

(*) Notice: Subject to any disclaimer, the term of this patent is extended or adjusted under 35 U.S.C. 154(b) by 133 days.

(21) Appl. No.: 16/159,094

(22) Filed: Oct. 12, 2018

(65) Prior Publication Data

US 2020/0116357 A1   Apr. 16, 2020

(51) Int. Cl.
*F23K 3/02* (2006.01)
*F23N 1/02* (2006.01)

(52) U.S. Cl.
CPC ............ *F23K 3/02* (2013.01); *F23N 1/025* (2013.01); *F23K 2201/10* (2013.01); *F23K 2203/006* (2013.01)

(58) Field of Classification Search
CPC .. F23K 3/02; F23K 2203/006; F23K 2201/10; F23N 1/025
See application file for complete search history.

(56) References Cited

U.S. PATENT DOCUMENTS

| 4,823,843 A * | 4/1989 | Golembiski | F23K 5/18 |
| | | | 137/605 |
| 6,481,361 B1 * | 11/2002 | Schindler | F23K 3/02 |
| | | | 110/101 C |

FOREIGN PATENT DOCUMENTS

| KR | 100902540 | 6/2009 |
| KR | 100915877 | 9/2009 |
| KR | 101140463 | 4/2012 |

* cited by examiner

*Primary Examiner* — David J Laux
(74) *Attorney, Agent, or Firm* — IPLA P.A.; James E. Bame

(57) ABSTRACT

A variable orifice for a pulverized coal pipe of a pulverizer includes a pipe body connected to and installed on a pipeline of the pulverized coal pipe for supplying a pulverized coal from the pulverizer to a boiler and including a diameter expansion portion having a diameter expanded more than a diameter of the pulverized coal pipe; an opening and closing portion installed inside the diameter expansion portion of the pipe body; a rotation actuating portion configured to rotate the inner opening and closing plate and the outer opening and closing plate in mutually different directions; and an opening and closing plate protection member coupled to an inner circumferential surface of each of the inner opening and closing plate and the outer opening and closing plate.

5 Claims, 14 Drawing Sheets

VARIABLE ORIFICE FOR PULVERIZED COAL PIPE OF PULVERIZER

BACKGROUND

The present invention relates to a variable orifice for a pulverized coal pipe of a pulverizer installed to control a pulverized coal conveying speed and pressure of the pulverized coal pipe from the pulverizer of a thermal power plant to each boiler.

A thermal power plant that uses coal as a main material generates electricity by supplying finely powered pulverized coal together with air, burning the pulverized coal in a boiler, vaporizing water in a water pipe pumped into the boiler, and rotating a turbine.

Such a thermal power plant typically includes a pulverizer for pulverizing supplied coal into pulverized coal of a fine size and supplying the pulverized coal to a boiler through a pulverized coal pipe, a blower for supplying air through the pulverized coal pipe, and the boiler for burning a mixture of the pulverized coal and the air conveyed through the pulverized coal pipe.

In the above-mentioned thermal power plant, a pulverized coal pipe is connected from a pulverizer to each boiler in a branch manner so as to convey pulverized coal from one pulverizer to a plurality of boilers. Thus, because a conveying distance from the pulverizer to each boiler is different, it is necessary to control the pulverized coal conveying speed and pressure of the pulverized coal pipe connected to each boiler in order to equalize the injection pressure of the pulverized coal supplied to the boiler. To this end, an orifice is installed in the pulverized coal pipe of the pulverizer connected to each boiler.

FIG. 1 is a front view showing a general pulverizer. FIG. 2 is a plan view of an embodiment of FIG. 1. FIG. 3 is a perspective view showing an orifice for a pulverized coal pipe of a pulverizer according to the related art.

As shown in FIGS. 1 and 2, the pulverizer includes a frame 10, a coal supply pipe 20 connected to an upper portion of the frame 10 to supply coal into the frame 10, a coal grinder (not shown) installed inside the frame 10 to grind the supplied coal into pulverized coal, a plurality of pulverized coal pipes 30 connected to the upper portion of the frame 10 to supply the pulverized coal to respective boilers, and an orifice 40 connected to and installed on a pipeline of each of the pulverized coal pipes 30, reducing a cross-sectional area of the pipeline, and controlling the conveying speed and pressure of the pulverized coal.

In the pulverizer configured above, when the coal is introduced into the frame 10 through the coal supply pipe 20, the coal is grinded into the pulverized coal by the coal grinder installed in the frame 10. The pulverized coal is raised by air or gas supplied to the inside of the frame 10 with ascending air current and discharged to the pulverized coal pipe 30 and then supplied to each boiler. At this time, the conveying speed and pressure of the pulverized coal moving through the pulverized coal pipe 30 are controlled by the orifice 40 connected to and installed on the pipeline of each of the pulverized coal pipes 30.

As shown in FIG. 3, the orifice 40 according to the related art includes a pipe body 41 connected to and installed on a pipeline of a pulverized coal pipe for supplying pulverized coal from the pulverizer to a boiler, an enclosure 42 coupled along the outer circumferential surface of the pipe body 41, a pair of opening and closing plates 43 separated up and down inside of the enclosure 42 and slidably installed to face each other so as to reduce a cross sectional area of pipe body 41, and a rotary knob 44 for sliding the pair of opening and closing plates 43 to be close to or away from each other and reducing or expanding the cross sectional area of pipe body 41. Although not shown in the drawing, a power transmitting portion (not shown) is provided for converting a rotational movement of the rotary knob 44 into a linear movement of the pair of opening and closing plates 43. That is, when an operator rotates the rotary knob 44 in the forward direction, the pair of opening and closing plates 43 slides to be close to each other such that the cross sectional area of pipe body 41 is reduced and when the operator rotates the rotary knob 44 in a reverse direction, the pair of opening and closing plates 43 slides to be away from each other such that the cross sectional area of pipe body 41 is enlarged. Accordingly, the conveying speed and pressure of the pulverized coal passing through the orifice 40 are controlled.

However, in the conventional orifice 40 configured as described above, the pair of opening and closing plates 43 are slidably installed inside the enclosure 42. There is a fatal problem that since the pulverized coal continues to be pushed into the inside of the enclosure 42 while remaining on a surface of the opening and closing plates 43, the sliding operation of the opening and closing plates 43 itself becomes conventionally impossible by the accumulated pulverized coal.

In order to solve such a problem, in the 'variable orifice for a pulverized coal pipe of a pulverizer' of Korean Registration Patent Publication No. 10-1140463 filed and registered by the present applicant, by deviating from a slide-in method into the inside of the conventional enclosure of the opening and closing plates for controlling the conveying speed and pressure of the pulverized coal, as shown in FIGS. 4 and 5, a new hemispherical opening and closing system for opening and closing a hemispherical tube 43c while rotating and operating a pair of inner opening and closing plate 43a and outer opening and closing plate 43b having a curved shape in mutually different directions so as to reduce or expand the cross-sectional area of the pipe body 41 is configured, thereby fundamentally preventing the orifice from malfunctioning or being inoperable due to the pulverized coal accumulated inside of the conventional enclosure.

In the hemispherical opening and closing method as described above, the inner opening and closing plate 43a and outer opening and the closing plate 43b are formed of high strength carbon steel. As shown in FIG. 5, since high pressure air passes along with the pulverized coal, abrasion of an inner circumferential surface actively proceeds by the impact of pulverized coal particles due to fast flow. In particular, erosion (C) occurs in upper end portions of the inner opening and closing plate 43a and the outer opening and closing plate 43b which face each other due to abrupt abrasion, which causes a problem in the conveying speed and pressure control of the fine pulverized coal.

The eroded upper end portions of the inner opening and closing plate 43a and the outer opening and closing plate 43b are formed in an unspecified shape, and when each is replaced with a whole, since it costs a lot, the inner opening and closing plate 43a and the outer opening and closing plate 43b are reused through a repair of cutting only the eroded parts into a specific shape separately and manufacturing a piece in accordance with the cut shape by welding. Time and cost-consuming maintenance for repairing the inner opening and closing plate 43a and the outer opening and closing plate 43b are also problematic.

As shown in FIGS. 4 and 5, in the case of the variable orifice for the pulverized coal pipe of the pulverizer according to the related art, a fixed rib 43*d* and the hemispherical tube 43*c* are installed inside of the pipe body 41 having the same diameter as that of the pulverized coal pipe 30, and the inner opening and closing plate 43*a* and the outer opening and closing plate 43*b* are coupled to each other through the hemispherical tube 43*c*, which causes a problem that a conveyance amount of the pulverized coal conveyed through the pipe body 41 is lowered, and, in particular, the pulverized coal is stacked and accumulated in a space between the hemispherical tube 43*c* and the pipe body 41.

Furthermore, as shown in FIG. 4, the configurations of a rotation motor 45 for rotating and opening and closing the inner opening and closing plate 43*a* and the outer opening and closing plate 43*b* and a gear portion 46 for transmitting the rotational force of the rotation motor 45 are designed coaxially with an inner rotation shaft 46*a*, which causes a problem that the length is increased and the space usability is lowered during installation.

SUMMARY OF THE INVENTION

Accordingly, the present invention has been made in view of the above-mentioned problems occurring in the prior art, and it is an object of the present invention to provide a variable orifice for a pulverized coal pipe of a pulverizer capable of improving the durability by minimizing erosion caused by abrasion of an opening and closing portion occurring when pulverized coal is conveyed, which is a problem in the conventional hemispherical opening and closing method, and facilitating the maintenance and repair by easily exchanging a main erosion portion.

It is another object of the present invention to provide a variable orifice for a pulverized coal pipe of a pulverizer capable of structurally improving and resolving a problem that a conveyance amount of pulverized coal is lowered and a problem that the pulverized coal is stacked and accumulated in the conventional hemispherical opening and closing method, and in particular, improving the space utilization.

To accomplish the above-mentioned objects, according to the present invention, there is provided a variable orifice for a pulverized coal pipe of a pulverizer including: a pipe body connected to and installed on a pipeline of the pulverized coal pipe for supplying a pulverized coal from the pulverizer to a boiler and including a diameter expansion portion having a diameter expanded more than a diameter of the pulverized coal pipe; an opening and closing portion installed inside the diameter expansion portion of the pipe body such that a pair of an inner opening and closing plate and an outer opening and closing plate having curved shapes are arranged to face each other and mutually overlapped to be a hemispherical shape as a whole, and the inner opening and closing plate and the outer opening and closing plate are opened together to extend a cross-sectional area of the pipe body or the inner opening and closing plate and the outer opening and closing plate are closed together to reduce the cross-sectional area of the pipe body; a rotation actuating portion configured to rotate the inner opening and closing plate and the outer opening and closing plate in mutually different directions such that the inner opening and closing plate and the outer opening and closing plate are opened or closed together to extend or reduce the cross-sectional area of the pipe body; and an opening and closing plate protection member coupled to an inner circumferential surface of each of the inner opening and closing plate and the outer opening and closing plate so as to protect the inner circumferential surface of each of the inner opening and closing plate and the outer opening and closing plate from an impact of the supplied pulverized coal.

According to the present invention, desirably, the opening and closing plate protection member is formed of a ceramic material which is molded as a main raw material of one or more kinds selected from the group consisting of nitrides, carbides, oxides, complex nitrides, complex carbides, complex oxides, carbonitrides, oxynitrides, and carbonates of aluminum (Al), silicon (Si), titanium (Ti), zirconium (Zr), hafnium (Hf), vanadium (V), niobium (Nb), tantalum (Ta), chrome (Cr), molybdenum (Mo), and tungsten (W).

According to the present invention, desirably, the opening and closing plate protection member is manufactured as a plate having a curvature radius of each of the inner opening and closing plate and the outer opening and closing plate such that the opening and closing plate protection member is fitted to the inner circumferential surface of each of the inner opening and closing plate and the outer opening and closing plate.

According to the present invention, desirably, each of the inner opening and closing plate and the outer opening and closing plate includes: a cutting plate having a cut certain part of upper end portions which face each other; and a main body plate that is a remaining part of the cutting plate, and the cutting plate is detachably coupled to the main body plate.

According to the present invention, desirably, the opening and closing plate protection member includes: a cutting plate protection member coupled to each of the inner opening and closing plate and the outer opening and closing plate such that the cutting plate protection member is fitted to an inner circumferential surface of the cutting plate of each of the inner opening and closing plate and the outer opening and closing plate; and a main body plate protection member coupled to each of the inner opening and closing plate and the outer opening and closing plate such that the main body plate protection member is fitted to an inner circumferential surface of the main body plate of each of the inner opening and closing plate and the outer opening and closing plate.

According to the present invention, desirably, the main body plate protection member has a uniform thickness, and the cutting plate protection member is formed to gradually increase from the thickness of the main body plate protection member toward an upper end.

According to the present invention, desirably, the opening and closing plate protection member is manufactured as a plurality of tiles attached to the inner circumferential surface of each of the inner opening and closing plate and the outer opening and closing plate.

According to the present invention, desirably, the rotation actuating portion includes: a rotation motor configured to rotate in forward and reverse directions; an inner rotation shaft configured to rotate by receiving power from the rotation motor and fixedly coupled to a rotation center of one end of the inner opening and closing plate to rotate the inner opening and closing plate; an outer rotation shaft configured as a hollow having an inner diameter larger than an outer diameter of the inner rotation shaft, the inner rotation shaft being inserted into the outer rotation shaft such that the outer rotation shaft is not interfered with a rotation of the inner rotation shaft, fixedly coupled to a rotation center of one end of the outer opening and closing plate to rotate the outer opening and closing plate; a power transmission means configured to receive a rotational force from a driving shaft of the rotation motor and transmitting the rotational force to each of the inner rotation shaft and the outer rotation shaft such that the inner rotation shaft and the outer rotation shaft rotate in opposite directions; and a rotation pip configured to connect rotation centers of other end of the inner opening and closing plate and other end of the outer opening and closing plate through a sidewall of the diameter expansion portion of the pipe body such that the inner opening and closing plate and the outer opening and closing plate freely rotate.

According to the present invention, desirably, the power transmission means includes: a driving worm gear coupled onto the driving shaft of the rotation motor and configured to rotate together with the rotation motor; a driving pinion gear geared with the driving worm gear; a first driven worm gear coaxially coupled with the driving pinion gear and configured to rotate together with the driving pinion gear; a first driven pinion gear coaxially coupled with the outer rotation shaft and configured to rotate together with the outer rotation shaft and geared with the first driven worm gear; a first parallel shaft gear coaxially coupled with the driving pinion gear and configured to rotate together with the driving pinion gear; a second parallel shaft gear geared with the first parallel shaft gear and configured to rotate in an opposite direction to the first parallel shaft gear; a second driven worm gear coaxially coupled with the second parallel shaft gear and configured to rotate together with the second parallel shaft gear; and a second driven pinion gear coupled onto the inner rotation shaft and configured to rotate together with the inner rotation shaft and geared with the second driven worm gear.

The variable orifice for the pulverized coal pipe of the pulverizer according to the present invention provides a new structure in which a diameter expansion portion is formed in a pipe body, and an opening and closing portion for reducing or expanding the cross-sectional area of the pipe body is installed in the diameter expansion portion of the pipe body such that a pair of an inner opening and closing plate and an outer opening and closing plate having curved shapes rotate and actuate in different directions to expand or reduce the cross-sectional area of the pipe body, and thus a sufficient conveyance amount of pulverized coal may be secured, and the pulverized coal may be prevented from being stacked and accumulated.

In particular, the durability may be improved through an opening and closing plate protection member by minimizing erosion caused by abrasion of an opening and closing portion occurring when pulverized coal is conveyed, which is a problem in the conventional hemispherical opening and closing method, and each of the inner opening and closing plate and the outer opening and closing plate may be configured as a cutting plate and a main body plate such that the cutting plate that is a main erosion portion may be easily exchanged, thereby facilitating the maintenance and repair.

Furthermore, a structure of a power transmission means for transmitting the rotational force to the inner opening and closing plate and the outer opening and closing plate from a rotation motor may be configured as a new mechanism, thereby improving the space utilization.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENTS

Figure 1:
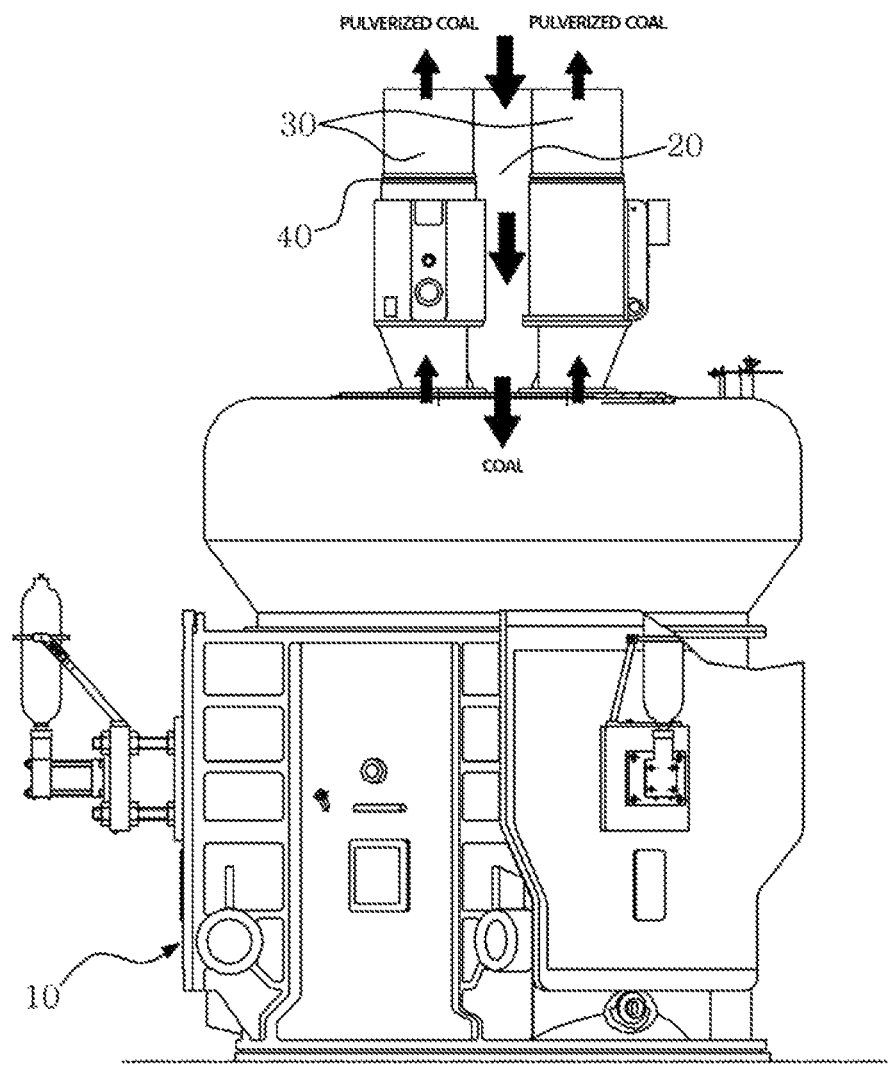
FIG. 1 is a front view showing a general pulverizer.
Figure 2:
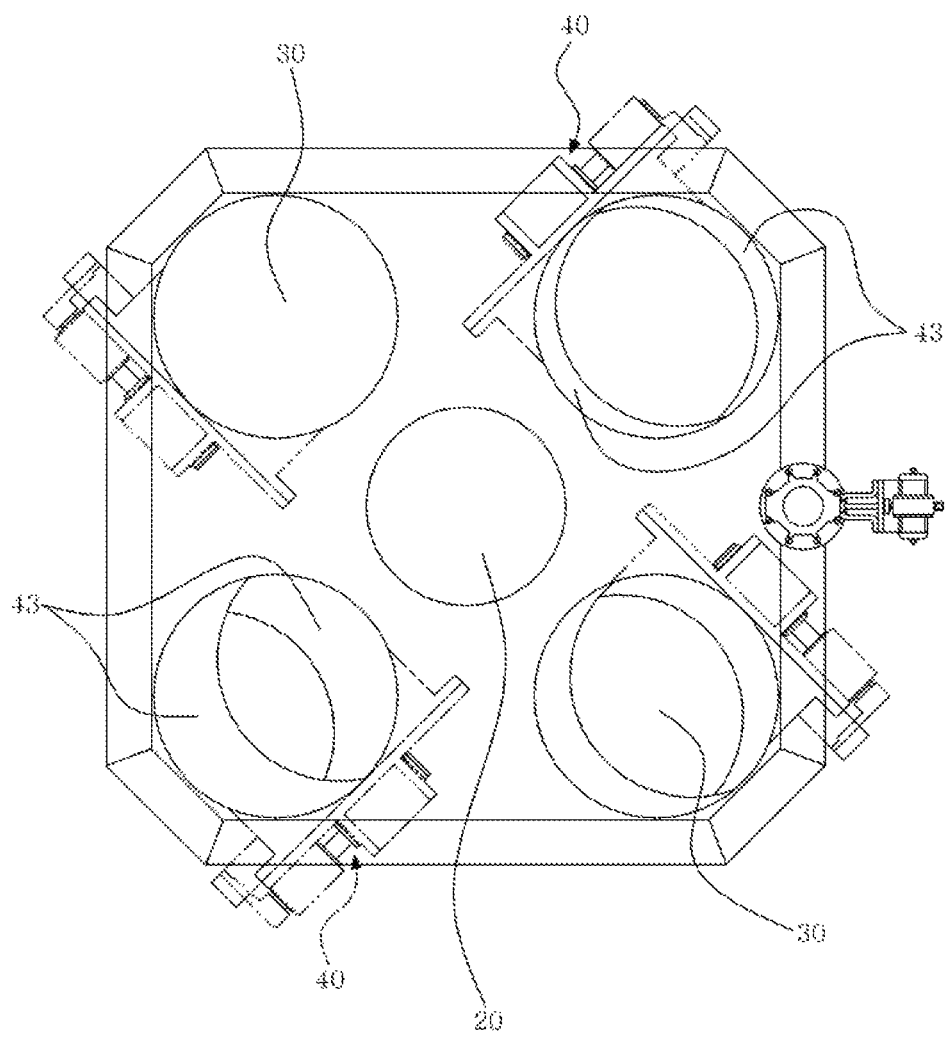
FIG. 2 is a plan view of a main part of an embodiment of FIG. 1.
Figure 3:
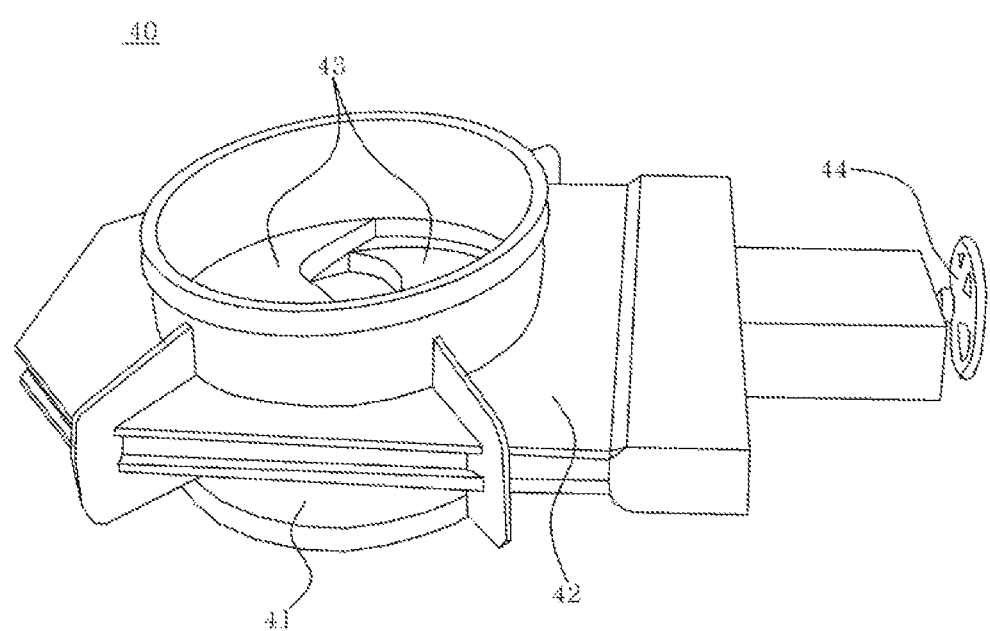
FIG. 3 is a perspective view showing an embodiment of an orifice for a pulverized coal pipe of a pulverizer according to the related art.
Figure 4:
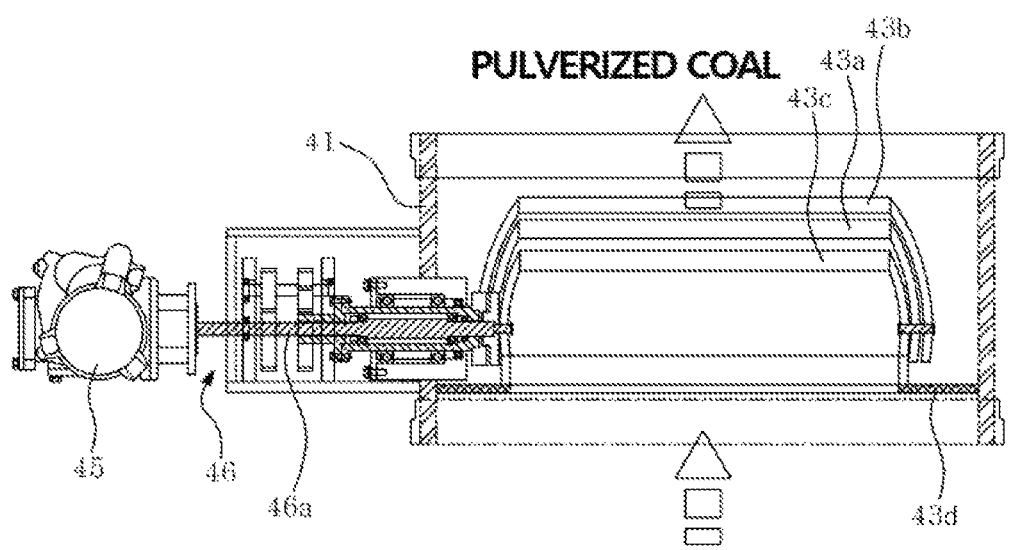
FIG. 4 is a side perspective cross-sectional view showing another embodiment of an orifice for a pulverized coal pipe of a pulverizer according to the related art.
Figure 5:
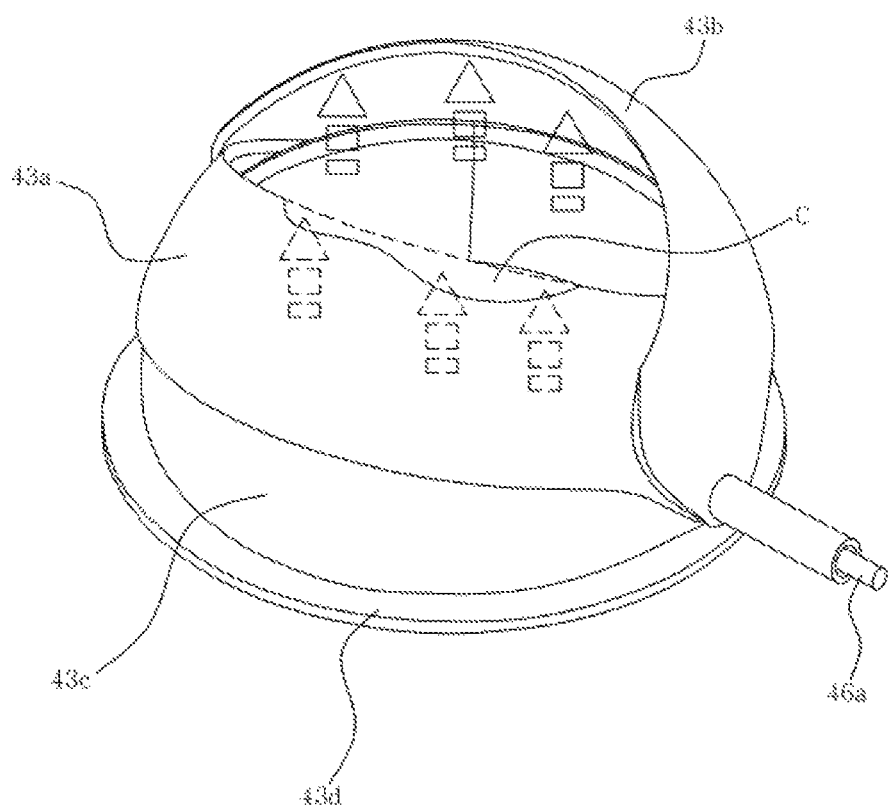
FIG. 5 is a main part perspective view showing an erosion process of an inner opening and closing plate and an outer opening and closing plate of the embodiment of FIG. 4.

Hereinafter, preferred embodiments of a variable orifice for a pulverized coal pipe of a pulverizer according to the present invention will be described in detail with reference to the accompanying drawings.

As shown in FIGS. 6 to 14, the variable orifice for the pulverized coal pipe of the pulverizer according to the present invention includes a pipe body 100, an opening and closing portion 200 configured as an inner opening and closing plate 210 and an outer opening and closing plate 220, a rotation actuating portion 300, and an opening and closing plate protection member 400. Also, each of the inner opening and closing plate 210 and the outer opening and closing plate 220 may be separated as a cutting plate 231 and a main body plate 232. The opening and closing plate protection member 400 may be partitioned as a cutting plate protection member 410 and a main body plate protection member 420, and may be manufactured as a plurality of tiles 430.

Figure 6:
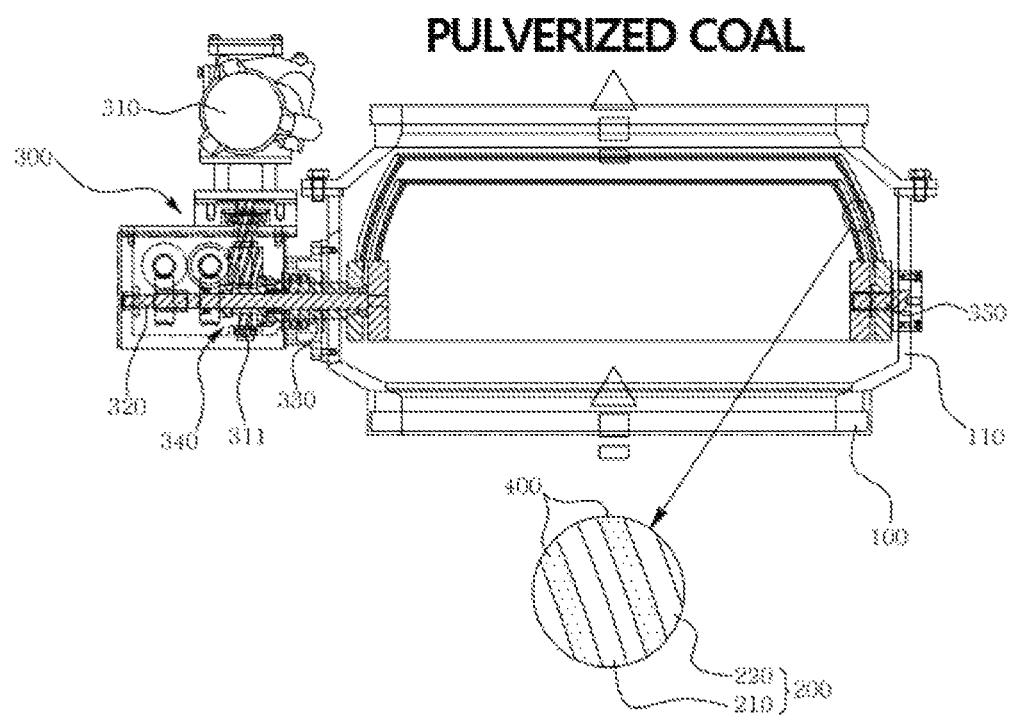
FIG. 6 is a side perspective cross-sectional view showing an embodiment of a variable orifice for a pulverized coal pipe of a pulverizer according to the present invention.
Figure 7:
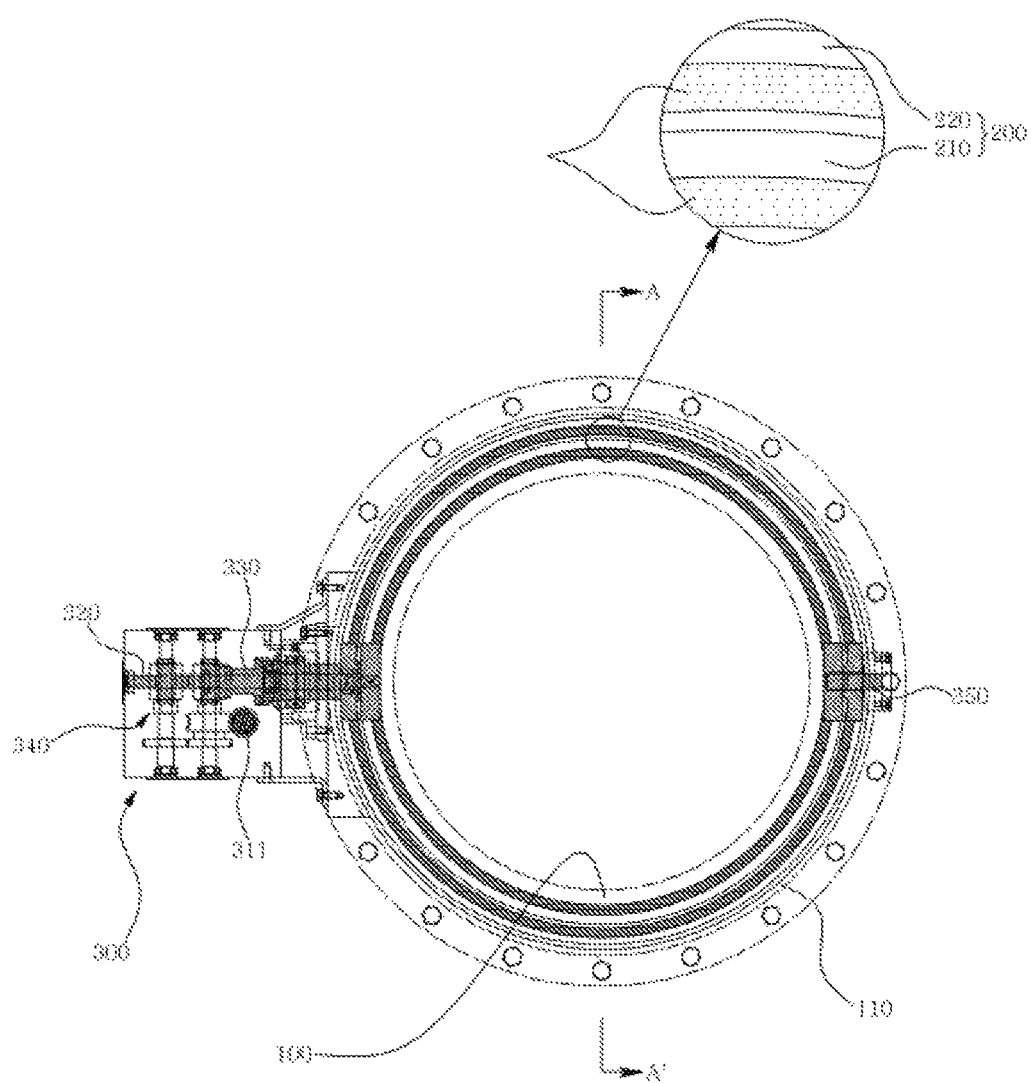
FIG. 7 is a plan view of the embodiment of FIG. 6.
Figure 8:
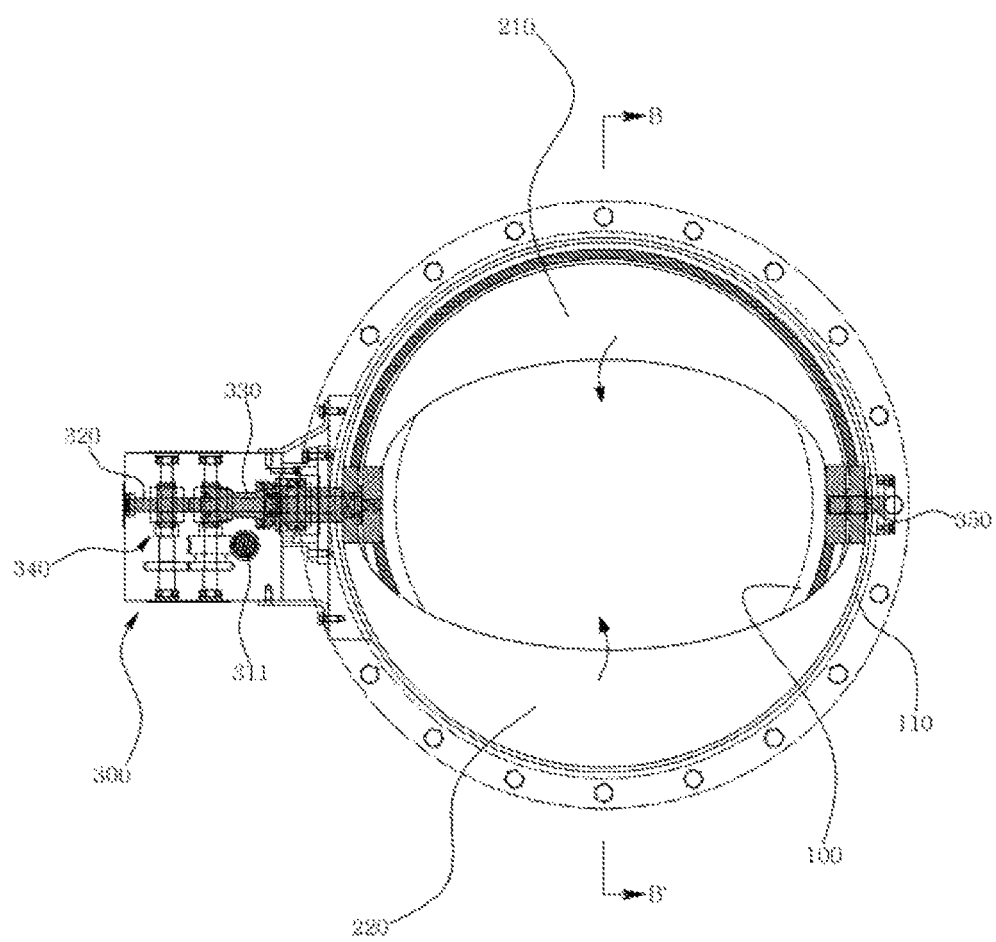
FIG. 8 is a plan view showing a process in which an inner opening and closing plate and an outer opening and closing plate closes a cross-sectional area of a pipe body in the embodiment of FIG. 7.

Referring to FIGS. 1 and 6, the pipe body 100 is connected to and installed on a pipeline of the pulverized coal pipe 30 for supplying pulverized coal from the pulverizer to a boiler (not shown), and is provided with a diameter expansion portion 110 having a diameter expanded more than a diameter of the pulverized coal pipe 30. The pipe body 100 has a cylindrical pipe body as its name and is connected to the pulverized coal pipe 30 such that the pulverized coal is supplied along the inside of the pipeline. At this time, the pipe body 100 is provided with the diameter expansion portion 110 having the diameter expanded more than the diameter of the pulverized coal pipe 30. The opening and closing portion 200 for controlling the conveying speed and pressure of the pulverized coal supplied through the pulverized coal pipe 30 is mounted and coupled to the diameter expansion portion 110 of the pipe body 100. Accordingly, it is possible to secure a sufficient conveyance amount of the pulverized coal and to prevent the pulverized coal from being stacked and accumulated.

As shown in FIGS. 6 to 12, the opening and closing part 200 is installed inside the diameter expansion portion 110 of the pipe body 100 such that a pair of the inner opening and closing plate 210 and the outer opening and closing plate 220 having curved shapes are arranged to face each other and mutually overlapped to be a hemispherical shape as a whole, and the inner opening and closing plate 210 and the outer opening and closing plate 220 are opened together to extend a cross-sectional area of the pipe body 100 or the inner opening and closing plate 210 and the outer opening and closing plate 220 are closed together to reduce the cross-sectional area of the pipe body 100.

The inner opening and closing plate 210 has a smaller diameter than the outer opening and closing plate 220 as its name, is located on the inner side and forms one side face of the hemispherical shape. Also, the outer opening and closing plate 220 has a larger diameter than the inner opening and closing plate 210 as its name, is located on the outer side and forms another side face of the hemispherical shape. The inner opening and closing plate 210 and the outer opening and closing plate 220 are overlayered to face each other and have the hemispherical shape as a whole, and upper end portions thereof facing each other rotate to be close to or spaced apart from each other such that the cross-sectional area of the pipe body 100 is extended or reduced.

The rotation actuating portion 300 rotates the inner opening and closing plate 210 and the outer opening and closing plate 220 in mutually different directions such that the inner opening and closing plate 210 and the outer opening and closing plate 220 are opened or closed together to extend or reduce the cross-sectional area of the pipe body 100. That is, the rotation actuating portion 300 is installed such that the inner opening and closing plate 210 and the outer opening and closing plate 220 described above may simultaneously rotate and actuate in different directions. Accordingly, the opening and closing portion 200 operates by the actuation of the rotation actuating portion 300 such that the conveying speed and the pressure of the pulverized coal supplied through a change in the across-sectional area of the pipe body 100 may be changed.

As shown in FIGS. 6 to 8 and FIGS. 13 and 14, the detailed configuration of the rotation actuating portion 300 includes a rotation motor 310, an inner rotation shaft 320, an outer rotation shaft 330, a power transmission means 340 and a rotation pin 350. The rotation motor 610 is a general electric motor that rotates in the forward and reverse directions. When the rotational force generated from the rotation motor 310 is referred to as an input, an output will be a rotation of the inner opening and closing plate 210 and the outer opening and closing plate 220 in different directions. At this time, the inner opening and closing plate 210 and the outer opening and closing plate 220 are required to be able to rotate in the forward and reverse directions since the inner opening and closing plate 210 and the outer opening and closing plate 220 actuate to open or close the cross-sectional area of the pipe body 100. Accordingly, the rotation motor 310 is a motor capable of rotating in the forward and reverse directions.

The inner rotation shaft 320 rotates by receiving power from the rotation motor 310 and is fixedly coupled to the rotation center of one end of the inner opening and closing plate 210 to rotate the inner opening and closing plate 210. The inner rotation shaft 320 rotates by receiving the input rotational force of the rotation motor 310 and is fixedly coupled to the rotation center of one end of the inner opening and closing plate 210 such that it becomes an inner output rotational force.

The outer rotation shaft 330 is a hollow having an inner diameter larger than an outer diameter of the inner rotation shaft 320, the inner rotation shaft 320 is inserted into the outer rotation shaft 330 such that the outer rotation shaft 330 is not interfered with the rotation of the inner rotation shaft 320, is fixedly coupled to the rotation center of one end of the outer opening and closing plate 220 to rotate the outer opening and closing plate 220. Here, the outer rotation shaft 330 rotates by receiving the input rotational force of the rotation motor 310, and is fixedly coupled to the rotation center of one end of the outer opening and closing plate 220 such that it becomes an outer output rotational force.

Since the inner output rotational force of the inner rotation shaft 320 and the outer output rotational force of the outer rotation shaft 330 must respectively rotate in opposite directions to each other by receiving the input rotational force of the rotary motor 310, the power transmission means 340 is required between a driving shaft 311 that generates the input rotational force of the rotation motor 310 and the inner rotation shaft 320 and the outer rotation shaft 330.

Figure 13:
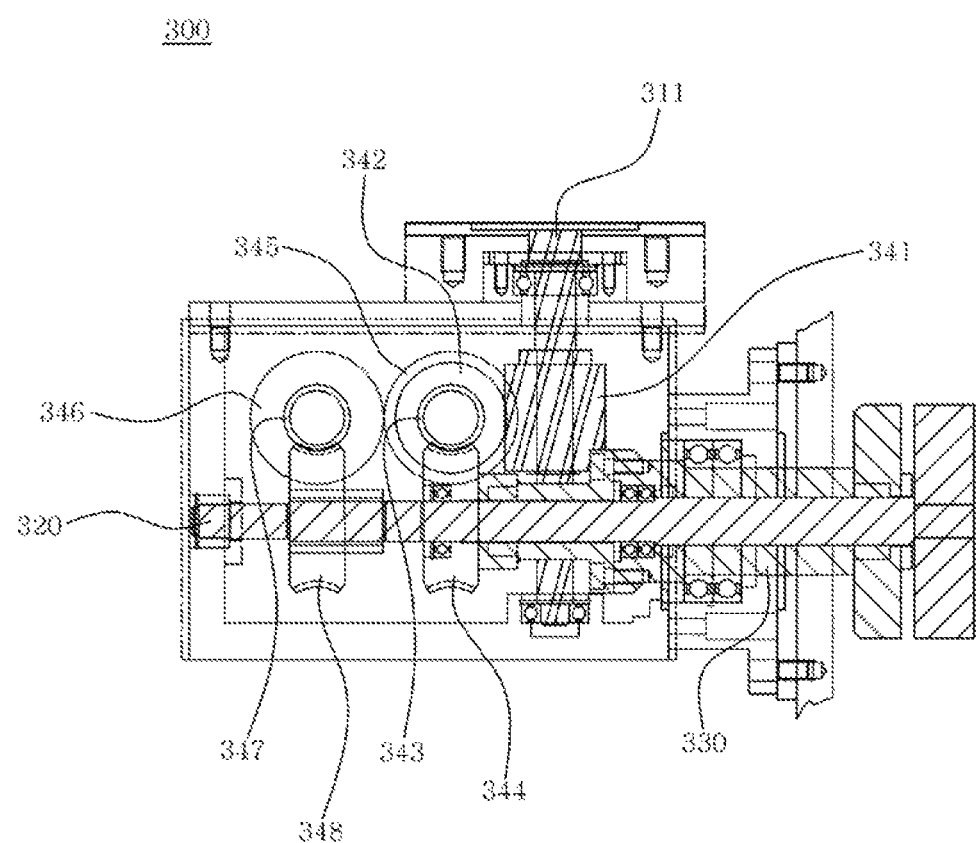
FIG. 13 is an enlarged side perspective cross-sectional view showing a power transmission means in the embodiment of FIG. 6.
Figure 14:
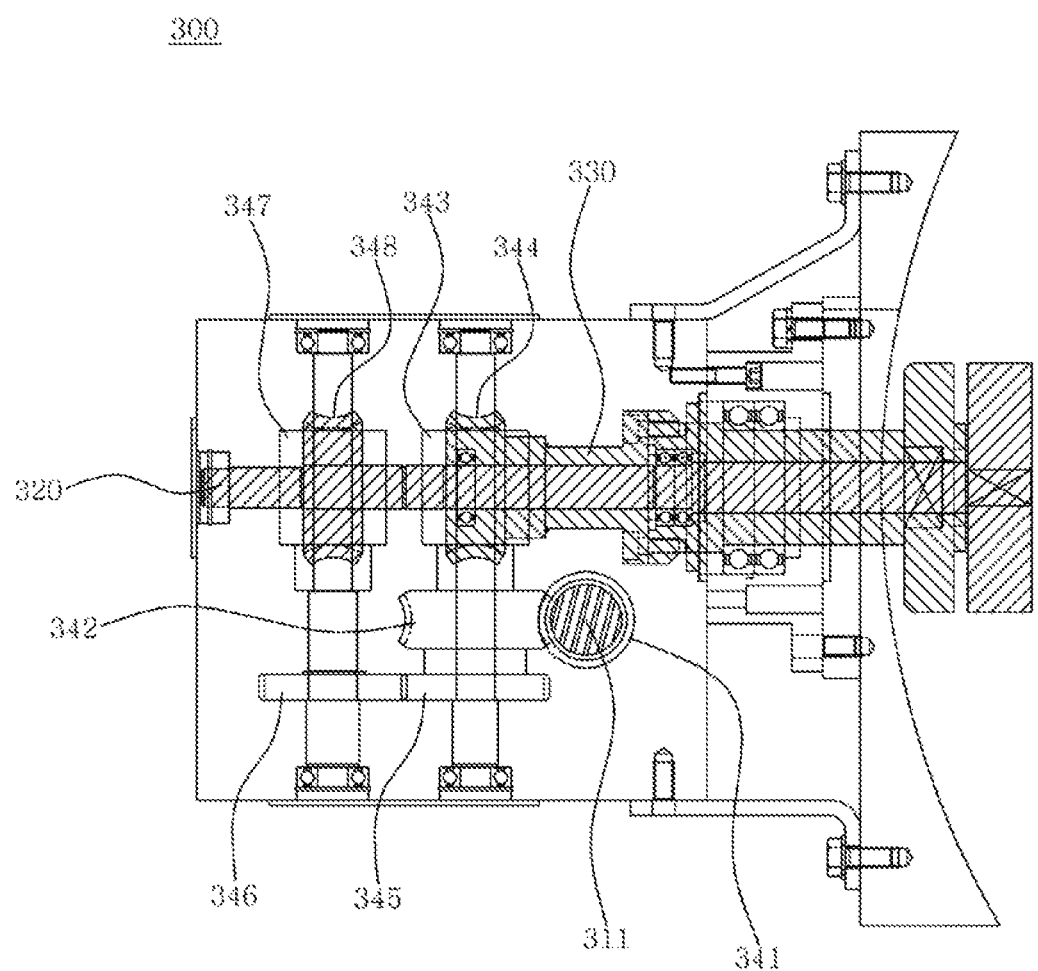
FIG. 14 is an enlarged side perspective cross-sectional view showing a power transmission means in the embodiment of FIG. 7.

That is, the power transmission means 340 receives the rotational force from the driving shaft 311 of the rotation motor 310 and transmits the rotational force to each of the inner rotation shaft 320 and the outer rotation shaft 330 such that the inner rotation shaft 320 and the outer rotation shaft 330 rotate in opposite directions. More specifically, as shown in FIGS. 13 and 14, the power transmission means 340 may include a driving worm gear 341, a driving pinion gear 342, a first driven worm gear 343, a first driven pinion gear 344, a first parallel shaft gear 345, a second parallel shaft gear 346, a second driven worm gear 347, and a second driven pinion gear 348.

The driving worm gear 341 is coupled onto the driving shaft 311 of the rotation motor 310 and rotates together with the rotation motor 310. The driving pinion gear 342 is geared with the driving worm gear 341. The first driven worm gear 343 is coaxially coupled with the driving pinion gear 342 and rotates together with the driving pinion gear 342. The first driven pinion gear 344 is coaxially coupled with the outer rotation shaft 330 and rotates together with the outer rotation shaft 330 and is geared with the first driven worm gear 343. Therefore, when the input rotational force is generated from the driving shaft 311 of the rotation motor 310, the driving worm gear 341 rotates the driving pinion gear 342 and rotates the first driven pinion gear 344 coaxially coupled with the driving pinion gear 342 to rotate the outer rotation shaft 330, and thus the outer output rotational force is generated.

Also, the first parallel shaft gear 345 is coaxially coupled with the driving pinion gear 342 and rotates together with the driving pinion gear 342. The second parallel shaft gear 346 is geared with the first parallel shaft gear 345 and rotates in an opposite direction to the first parallel shaft gear 345. The second driven worm gear 347 is coaxially coupled with the second parallel shaft gear 346 and rotates together with the second parallel shaft gear 346. The second driven pinion gear 348 is coupled onto the inner rotation shaft 320 and rotates together with the inner rotation shaft 320 and is geared with the second worm gear 347. Therefore, when the input rotational force is generated from the driving shaft 311 of the rotation motor 310, the driving worm gear 341 rotates the driving pinion gear 342, and the first parallel shaft gear 345 coaxially coupled with the driving pinion gear 342 rotates the second parallel shaft gear 346 in the opposite direction. When the second driven worm gear 347 coaxially coupled with the second parallel shaft gear 346 rotates, the second driven pinion gear 348 rotates to rotate the inner rotation shaft 320, and thus the inner output rotational force is generated.

As described above, the input rotational force generated from the driving shaft 311 of the rotation motor 310 is transmitted to the outer output rotational force of the outer rotation shaft 330 through the driving worm gear 341, the driving pinion gear 342, the first driven worm gear 343, and the first driven pinion gear 344, and secondly, the rotational force in the opposite direction is transmitted to the inner output rotational force of the inner rotation shaft 320 through the first parallel shaft gear 345, the second parallel shaft gear 346, the second driven worm gear 347, and the second driven pinion gear 348. Therefore, when the inner opening and closing plate 210 rotating together with the inner rotation shaft 320 rotates in the forward direction, since the outer opening and closing plate 220 rotating together with the outer rotation shaft 330 rotates in the reverse direction, the inner opening and closing plate 210 and the outer opening and closing plate 220 rotate in different directions.

At this time, although the rotation center of one end of the inner opening and closing plate 210 is connected to the inner rotation shaft 320 and rotates, and the rotation center of one end of the outer opening plate 220 is connected to the outer rotation shaft 330 and rotates, unless the other end of the inner opening and closing plate 210 and the other end of the outer opening and closing plate 220 are rotatably fixed, the rotation actuation will not be performed properly. Thus, as shown in FIGS. 6 to 12, the rotation pin 350 connects the rotation centers of the other end of the inner opening and closing plate 210 and the other end of the outer opening and closing plate 220 through a sidewall of the diameter expansion portion 110 of the pipe body 100 such that the inner opening and closing plate 210 and the outer opening and closing plate 220 freely rotate.

Figure 9:
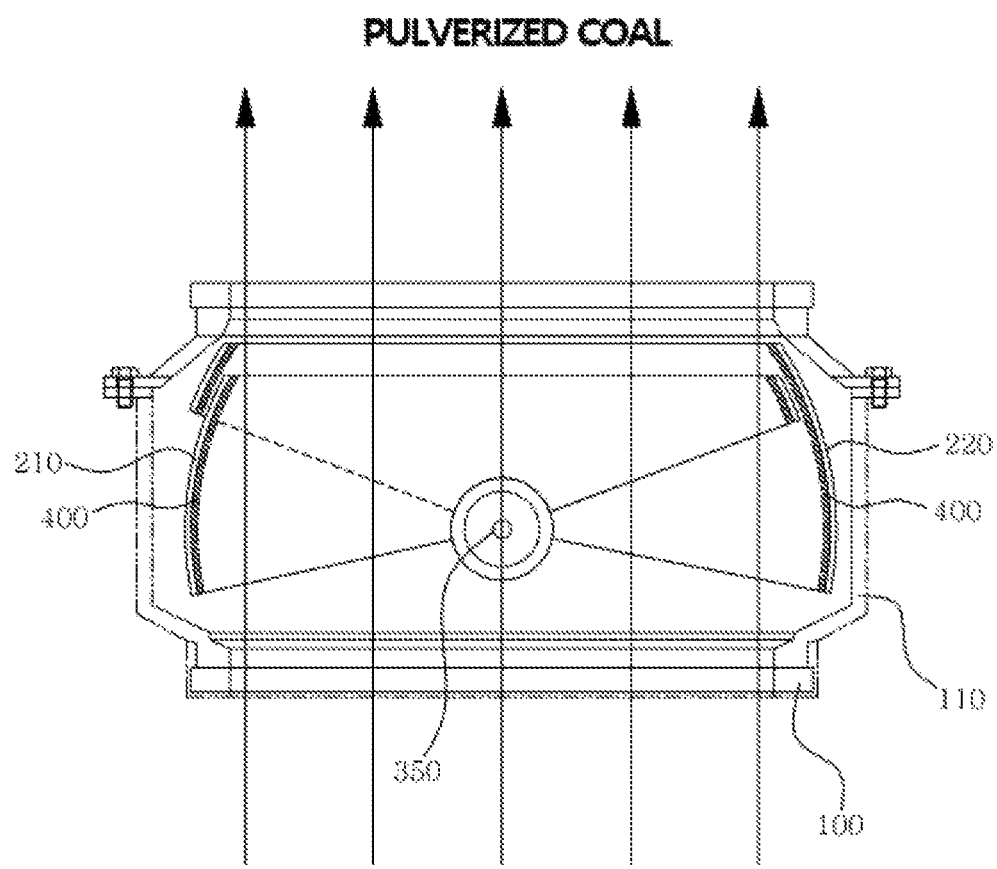
FIG. 9 is a cross-sectional view taken along a line A-A' in the embodiment of FIG. 7.
Figure 10:
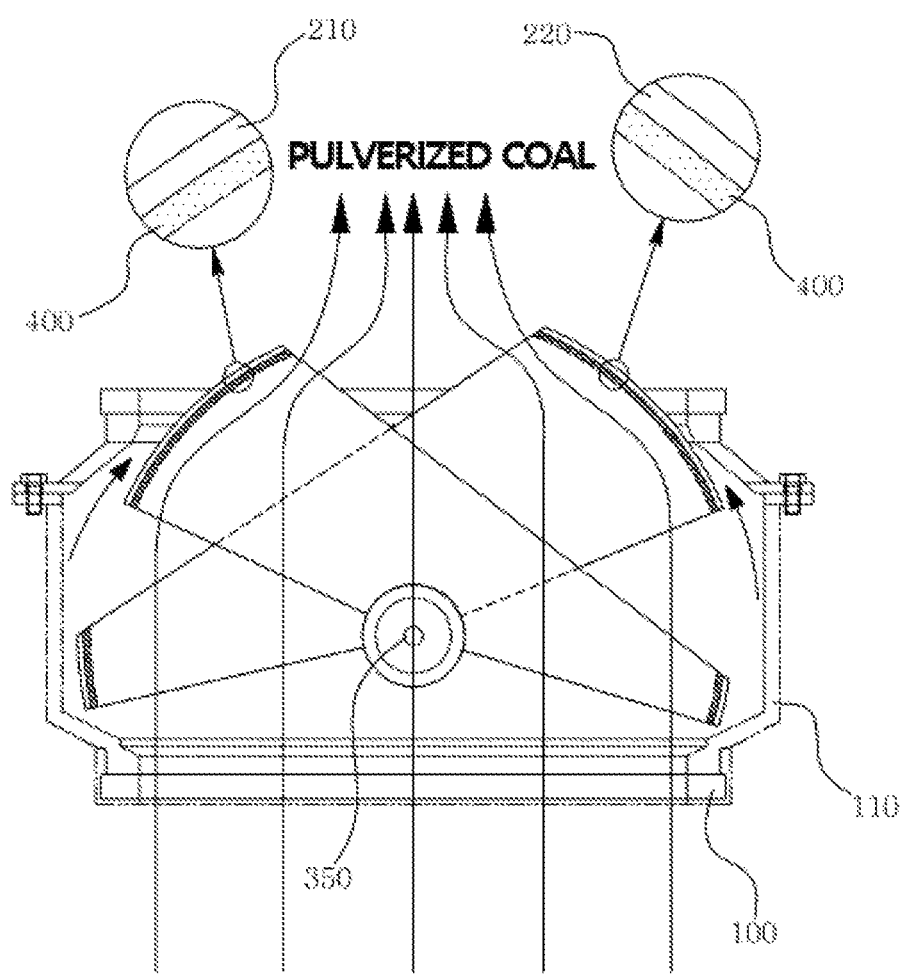
FIG. 10 is a cross-sectional view taken along a line B-B' in the embodiment of FIG. 8.

Meanwhile, in the case of the hemispherical opening and closing method of the inner opening and closing plate 210 and the outer opening and closing plate 220, the inner opening and closing plate 210 and the outer opening and closing plate 220 are formed of high strength carbon steel. As shown in FIGS. 9 and 10, since high pressure air passes along with the pulverized coal, abrasion of an inner circumferential surface of each of the inner opening and closing plate 210 and the outer opening and closing plate 220 actively proceeds by the impact of pulverized coal particles due to fast flow. In particular, erosion occurs in upper end portions of the inner opening and closing plate 210 and the outer opening and closing plate 220 which face each other due to abrupt abrasion, which causes a problem in the conveying speed and pressure control of a fine pulverized coal. In order to solve this problem, as shown in FIGS. 6 to 12, the opening and closing plate protection member 400 is installed.

That is, the opening and closing plate protection member 400 is coupled to the inner circumferential surface of each of the inner opening and closing plate 210 and the outer opening and closing plate 220 so as to protect the inner circumferential surface of each of the inner opening and closing plate 210 and the outer opening and closing plate 220 from the impact of the pulverized coal supplied from the opening and closing plate protection member 400. Specifically, the opening and closing plate protection member 400 must be formed of a material having high impact resistance and wear resistance even under a high temperature environment, and may be typically a ceramic material.

The ceramic material is a non-metallic inorganic material obtained through a heat treatment process, and is called as three major materials together with organic and metal. Ceramics, glass, cement, etc. have been widely used as ceramics, and have recently taken an important place in the mechanical industry. The characteristics of these ceramics are attracting attention due to the emergence of new ceramics (fine ceramics) which actively exploits the advantages of heat resistance, high strength, corrosion resistance, and abrasion resistance. For example, the opening and closing plate protection member 400 may be formed of a ceramic material which is molded as a main raw material of one or more kinds selected from the group consisting of nitrides, carbides, oxides, complex nitrides, complex carbides, complex oxides, carbonitrides, oxynitrides, and carbonates of aluminum (Al), silicon (Si), titanium (Ti), zirconium (Zr), hafnium (Hf), vanadium (V), niobium (Nb), tantalum (Ta), chrome (Cr), molybdenum (Mo), and tungsten (W).

As shown in FIGS. 6 to 12, the opening and closing plate protection member 400 formed of such a ceramic material may be manufactured as a plate having a curvature radius of each of the inner opening and closing plate 210 and the outer opening and closing plate 220 such that the opening and closing plate protection member 400 is fitted to the inner circumferential surface of each of the inner opening and closing plate 210 and the outer opening and closing plate 220. Accordingly, the inner circumferential surface of each of the inner opening and closing plate 210 and the outer opening and closing plate 220 may be protected by the opening and closing plate protection member 400 and thus protected from the impact and abrasion of the pulverized coal conveyed together with the high pressure air.

At this time, since the upper end portions of the inner opening and closing plate 210 and the outer opening and closing plate 220 which face each other are intensively eroded, when the erosion of the opening and closing plate protection member 400 is completed, the inner opening and closing plate 210 and the outer opening and closing plate 220 are inevitably eroded. However, since the upper end portions of the inner opening and closing plate 210 and the outer opening and closing plate 220 are mostly eroded as compared with lower end portions or the center of the upper end portions, it is necessary to facilitate maintenance and repair by easily exchanging the upper end portions that are the main erosion portions.

Figure 11:
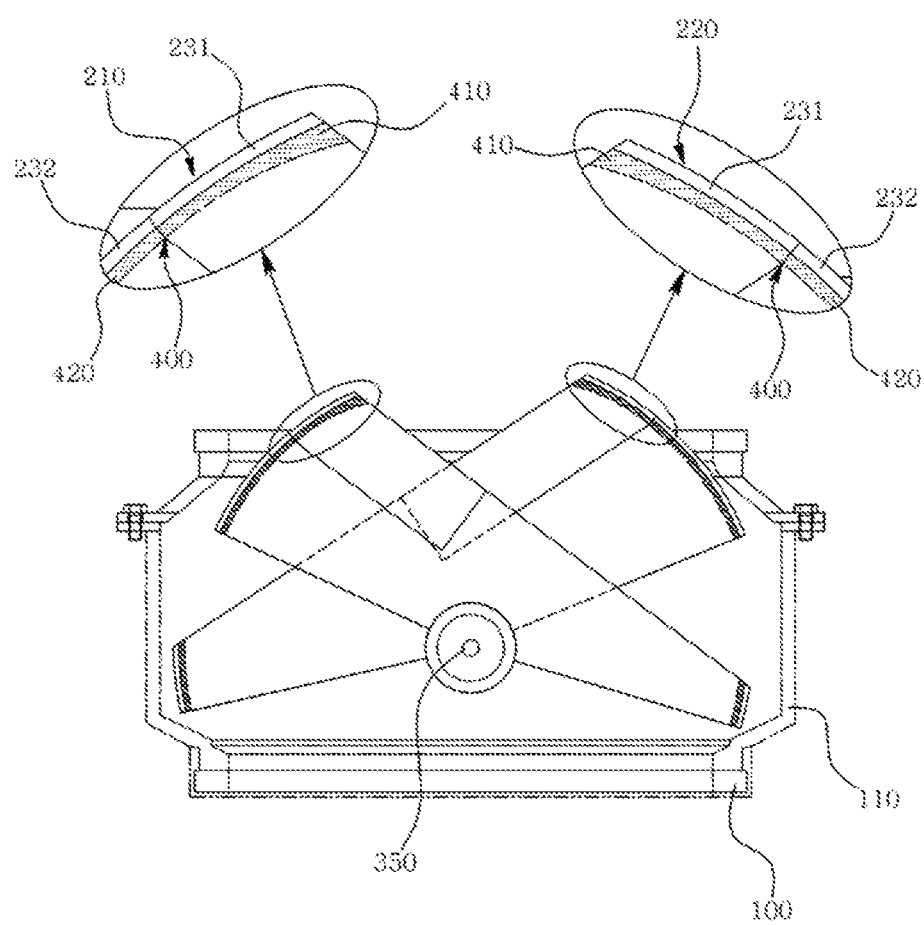
FIG. 11 is a cross-sectional view showing another embodiment with respect to the embodiment of FIG. 10.

That is, as shown in FIG. 11, each of the inner opening and closing plate 210 and the outer opening and closing plate 220 is configured as the cutting plate 231 having a cut certain part of the upper end portions which face each other and the main body plate 232 that is a remaining part of the cutting plate 231. At this time, the cutting plate 231 may be detachably coupled to the main body plate 232. For example, the cutting plate 231 may be detachably coupled such as the cutting plate 231 is inserted into the main body plate 232 to be bolted or is bolted to the main body plate 232 through a separate over-ride member (not shown).

As described above, when the cutting plate 231 that is the main erosion portion is previously manufactured and an inner circumferential surface or an upper end portion of the cutting plate 231 is eroded by the use of the cutting plate 231, the previously manufactured cutting plate 231 may be easily exchanged from the main body plate 232.

At this time, as shown in FIG. 11, the opening and closing plate protection member 400 may include the cutting plate protection member 410 manufactured as a plate having a curvature radius of each of the inner opening and closing plate 210 and the outer opening and closing plate 220 such that the opening and cutting plate protection member 410 is fitted to the inner circumferential surface of the cutting plate 231 of each of the inner opening and closing plate 210 and the outer opening and closing plate 220, and the main body plate protection member 420 manufactured as a plate having the curvature radius of each of the inner opening and closing plate 210 and the outer opening and closing plate 220 such that the main body plate protection member 420 is fitted to an inner circumferential surface of the main body plate 232 of each of the inner opening and closing plate 210 and the outer opening and closing plate 220. That is, the cutting plate protection member 410 and the main body plate protection member 420 are manufactured in advance or combined with each other in accordance with the shapes of the cutting plate 231 and the main body plate 232, thereby facilitating repair and exchange.

Also, since the cutting plate protection member 410 of the opening and closing plate protection member 400 constitutes the upper end portion of the inner circumferential surface of each of the inner opening and closing plate 210 and the outer opening and closing plate 220, that is, the main erosion portion, the cutting plate protection member 410 needs to have a strengthened structure in comparison with the main body plate protection member 420. To this end, the main body plate protection member 420 may be formed to have a uniform thickness and the cutting plate protection member 410 may be formed to gradually increase from the thickness of the main body plate protection member 420 toward the upper end. That is, when the pulverized coal moves with the high pressure air, the pulverized coal contacts the main plate protection member 420 and is guided to move to the lower end of the cutting plate protection member 410 without resistance. Even if erosion increases, as the pulverized coal moves to the upper end of the cutting plate protection member 410, the thickness of the cutting plate protection member 410 gradually increases, and thus the durability due to erosion may be further enhanced.

Figure 12:
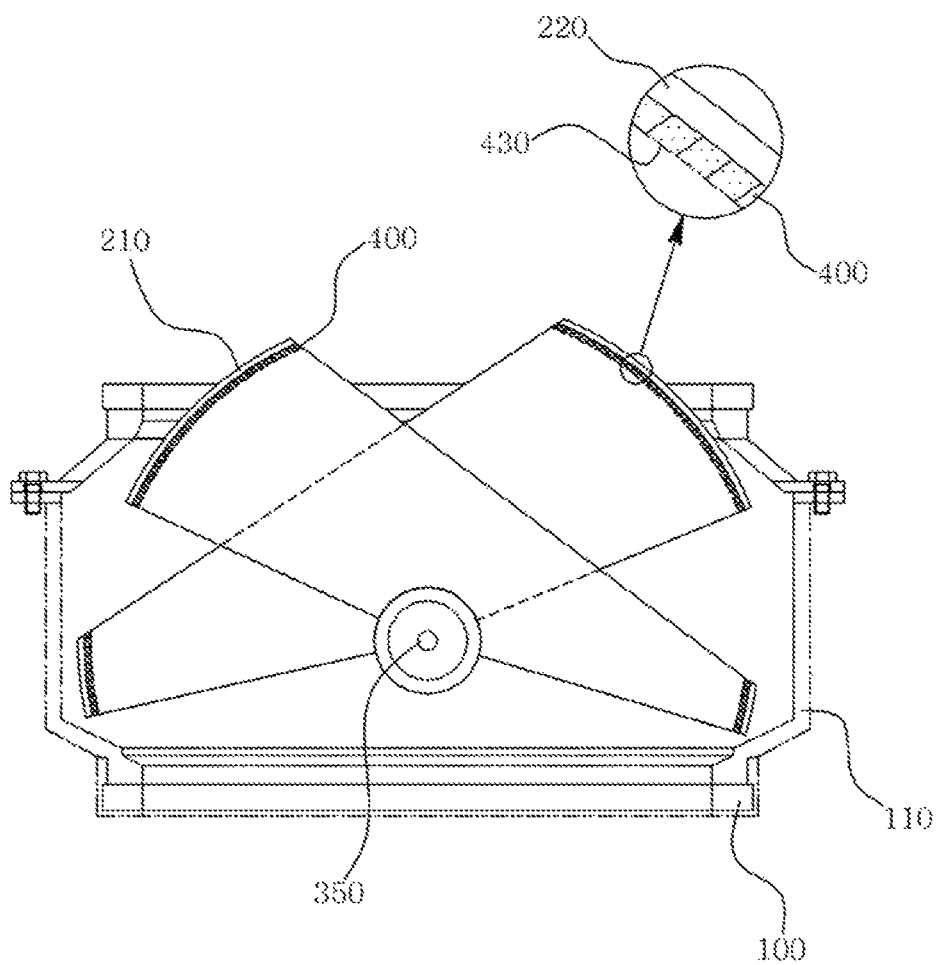
FIG. 12 is a cross-sectional view showing another embodiment with respect to the embodiment of FIG. 10.

Also, without manufacturing the opening and closing plate protection member 400 as one or two plates, as shown in FIG. 12, the opening and closing plate protection member 400 may be manufactured as the plurality of tiles 430, and thus only the abraded and eroded tiles 430 are exchanged, thereby minimizing the exchange cost. That is, the opening and closing plate protection member 400 may be manufactured as the plurality of tiles 430 attached to the inner circumferential surface of each of the inner opening and closing plate 210 and the outer opening and closing plate 220. In this case, the opening and closing plate protection member 400 may also be formed such that the plurality of tiles 430 attached to the inner circumferential surface of each of the inner opening and closing plate 210 and the outer opening and closing plate 220 are gradually increased in thickness from the lower end to the upper end.

However, when the opening and closing plate protection member 400 is manufactured as the plurality of tiles 430, the material cost of the opening and closing plate protection member 400 may be reduced. On the contrary, while there is a disadvantage that the number of repairs and exchanges increases, if the opening and closing plate protection member 400 is manufactured as one or two plates, there is a loss in the material cost, but there is an advantage that repair and exchange may be facilitated.

As described above, the variable orifice for the pulverized coal pipe of the pulverizer according to the present invention provides a new structure in which the diameter expansion portion 110 is formed in the pipe body 100, and the opening and closing portion 200 for reducing or expanding the cross-sectional area of the pipe body 100 is installed in the diameter expansion portion 110 of the pipe body 100 such that a pair of the inner opening and closing plate 210 and the outer opening and closing plate 220 having curved shapes rotate and actuate in different directions to expand or reduce the cross-sectional area of the pipe body 100, and thus a sufficient conveyance amount of pulverized coal may be secured, and the pulverized coal may be prevented from being stacked and accumulated.

In particular, the durability may be improved through the opening and closing plate protection member 400 by minimizing erosion caused by abrasion of the opening and closing portion 200 occurring when pulverized coal is conveyed, which is a problem in the conventional hemispherical opening and closing method, and each of the inner opening and closing plate 210 and the outer opening and closing plate 220 may be configured as the cutting plate 231 and the main body plate 232 such that the cutting plate 231 that is a main erosion portion may be easily exchanged, thereby facilitating the maintenance and repair.

Furthermore, a structure of the power transmission means 340 for transmitting the rotational force to the inner opening and closing plate 210 and the outer opening and closing plate 220 from the rotation motor 310 may be configured as a new mechanism, thereby improving the space utilization.

While the present invention has been described with reference to the particular illustrative embodiments, it is not to be restricted by the embodiments but only by the appended claims. It is to be appreciated that those skilled in the art may change or modify the embodiments without departing from the scope and spirit of the present invention.

What is claimed is:

1. A variable orifice for a pulverized coal pipe of a pulverizer comprising:
   a pipe body connected to and installed on a pipeline of the pulverized coal pipe for supplying a pulverized coal from the pulverizer to a boiler and comprising a diameter expansion portion having a diameter expanded more than a diameter of the pulverized coal pipe;
   an opening and closing portion installed inside the diameter expansion portion of the pipe body such that a pair of an inner opening and closing plate and an outer opening and closing plate having curved shapes are arranged to face each other and mutually overlapped to be a hemispherical shape as a whole, and the inner opening and closing plate and the outer opening and closing plate are opened together to extend a cross-sectional area of the pipe body or the inner opening and closing plate and the outer opening and closing plate are closed together to reduce the cross-sectional area of the pipe body;
   a rotation actuating portion configured to rotate the inner opening and closing plate and the outer opening and closing plate in mutually different directions such that the inner opening and closing plate and the outer opening and closing plate are opened or closed together to extend or reduce the cross-sectional area of the pipe body; and an opening and closing plate protection member coupled to an inner circumferential surface of each of the inner opening and closing plate and the outer opening and closing plate so as to protect the inner circumferential surface of each of the inner opening and closing plate and the outer opening and closing plate from an impact of the supplied pulverized coal, wherein the opening and closing plate protection member is formed of a ceramic material which is molded as a main raw material of one or more kinds selected from the group consisting of nitrides, carbides, oxides, complex nitrides, complex carbides, complex oxides, carbonitrides, oxynitrides, and carbonates of aluminum (Al), silicon (Si), titanium (Ti), zirconium (Zr), hafnium (Hf), vanadium (V), niobium (Nb), tantalum (Ta), chrome (Cr), molybdenum (Mo), and tungsten (W), wherein each of the inner opening and closing plate and the outer opening and closing plate comprises:

a cutting plate having a cut certain part of upper end portions which face each other; and a main body plate that is a remaining part of the cutting plate, wherein the cutting plate is detachably coupled to the main body plate, wherein the opening and closing plate protection member comprises:

a cutting plate protection member coupled to each of the inner opening and closing plate and the outer opening and closing plate such that the cutting plate protection member is fitted to an inner circumferential surface of the cutting plate of each of the inner opening and closing plate and the outer opening and closing plate; and a main body plate protection member coupled to each of the inner opening and closing plate and the outer opening and closing plate such that the main body plate protection member is fitted to an inner circumferential surface of the main body plate of each of the inner opening and closing plate and the outer opening and closing plate, wherein the main body plate protection member has a uniform thickness, wherein the cutting plate protection member is formed to gradually increase from the thickness of the main body plate protection member toward an upper end.

2. The variable orifice for a pulverized coal pipe of a pulverizer according to claim 1, wherein the opening and closing plate protection member is manufactured as a plate having a curvature radius of each of the inner opening and closing plate and the outer opening and closing plate such that the opening and closing plate protection member is fitted to the inner circumferential surface of each of the inner opening and closing plate and the outer opening and closing plate.

3. The variable orifice for a pulverized coal pipe of a pulverizer according to claim 1, wherein the opening and closing plate protection member is manufactured as a plurality of tiles attached to the inner circumferential surface of each of the inner opening and closing plate and the outer opening and closing plate.

4. The variable orifice for a pulverized coal pipe of a pulverizer according to claim 1, wherein the rotation actuating portion comprises:

a rotation motor configured to rotate in forward and reverse directions;

an inner rotation shaft configured to rotate by receiving power from the rotation motor and fixedly coupled to a rotation center of one end of the inner opening and closing plate to rotate the inner opening and closing plate;

an outer rotation shaft configured as a hollow having an inner diameter larger than an outer diameter of the inner rotation shaft, the inner rotation shaft being inserted into the outer rotation shaft such that the outer rotation shaft is not interfered with a rotation of the inner rotation shaft, fixedly coupled to a rotation center of one end of the outer opening and closing plate to rotate the outer opening and closing plate;

a power transmission means configured to receive a rotational force from a driving shaft of the rotation motor and transmitting the rotational force to each of the inner rotation shaft and the outer rotation shaft such that the inner rotation shaft and the outer rotation shaft rotate in opposite directions; and a rotation pip configured to connect rotation centers of other end of the inner opening and closing plate and other end of the outer opening and closing plate through a sidewall of the diameter expansion portion of the pipe body such that the inner opening and closing plate and the outer opening and closing plate freely rotate.

5. The variable orifice for a pulverized coal pipe of a pulverizer according to claim 4, wherein the power transmission means comprises:

a driving worm gear coupled onto the driving shaft of the rotation motor and configured to rotate together with the rotation motor;

a driving pinion gear geared with the driving worm gear;

a first driven worm gear coaxially coupled with the driving pinion gear and configured to rotate together with the driving pinion gear;

a first driven pinion gear coaxially coupled with the outer rotation shaft and configured to rotate together with the outer rotation shaft and geared with the first driven worm gear;

a first parallel shaft gear coaxially coupled with the driving pinion gear and configured to rotate together with the driving pinion gear;

a second parallel shaft gear geared with the first parallel shaft gear and configured to rotate in an opposite direction to the first parallel shaft gear;

a second driven worm gear coaxially coupled with the second parallel shaft gear and configured to rotate together with the second parallel shaft gear; and a second driven pinion gear coupled onto the inner rotation shaft and configured to rotate together with the inner rotation shaft and geared with the second driven worm gear.

* * * * *